United States Patent [19]

Swaney et al.

[11] Patent Number: 4,488,232
[45] Date of Patent: Dec. 11, 1984

[54] SELF-ADJUSTING, DISTRIBUTED CONTROL, ACCESS METHOD FOR A MULTIPLEXED SINGLE-SIGNAL DATA BUS

[75] Inventors: Richard E. Swaney, Fullerton; John Hargrove, Costa Mesa, both of Calif.

[73] Assignee: Hughes Aircraft Company, El Segundo, Calif.

[21] Appl. No.: 608,933

[22] Filed: May 10, 1984

Related U.S. Application Data

[63] Continuation of Ser. No. 307,971, Oct. 2, 1981, abandoned.

[51] Int. Cl.³ .............................................. G06F 15/16
[52] U.S. Cl. .................................................... 364/200
[58] Field of Search ......................................... 364/200

[56] References Cited

U.S. PATENT DOCUMENTS

| | | | |
|---|---|---|---|
| 3,813,651 | 5/1974 | Yamada | 364/200 |
| 3,978,451 | 8/1976 | Ito et al. | 340/825.5 |
| 4,199,661 | 4/1980 | White et al. | 370/91 |
| 4,223,380 | 9/1980 | Antonaccio et al. | 364/200 |
| 4,232,294 | 11/1980 | Burke et al. | 340/825.5 |
| 4,387,425 | 6/1983 | El-Gohary | 364/200 |

Primary Examiner—Raulfe B. Zache
Attorney, Agent, or Firm—E. F. Oberheim; A. W. Karambelas

[57] ABSTRACT

A method of providing access to a multiplexed data bus having a plurality of data processing units coupled thereto. Each unit self-assigns sequence numbers thereto for identification purposes. The unit having the lowest sequence number obtains immediate access to the bus and may relinquish the bus by transmitting a control word, or token, with an incremented sequence number. All units receive the token but only the unit having the incremented sequence number gains access to the bus. The token passing continues through the series of sequence numbers and then recycles when no unit accepts the token (bus timeout). A newly added unit self-assigns a sequence number equal to the one transmitted prior to the bus timeout and thus acquires bus access on the next cycle. If a unit in the cycle fails, a bus timeout occurs mid-cycle and the access loop recycles. The units not gaining access to the bus during the cycle decrement their sequence numbers to close the gap, and hence gain access on the next cycle. The method allows for continuous system operation if units are added or deleted, without interrupting bus operation.

28 Claims, 5 Drawing Figures

SELF-ADJUSTING, DISTRIBUTED CONTROL, ACCESS METHOD FOR A MULTIPLEXED SINGLE-SIGNAL DATA BUS

This application is a continuation of application Ser. No. 307,971, filed Oct. 2, 1981, now abandoned.

BACKGROUND OF THE INVENTION

The present invention relates generally to multiplexed data buses, and more particularly, to an access method for a multiplexed data bus which employs a single signal to control the operation of systems attached thereto.

In present ground command, control, communications, and intellingence information systems, the traditional hierarchical architecture under control of a central computer results in an inflexible system configuration. A large percentage of the development, procurement, and maintenance costs of such systems are attributable to interface circuitry, cables, and connectors, and the like. Typical system specifications require a system architecture capable of continued operation during the failure and repair of individual units, and during operational reconfiguration of the system. This necessitates an interconnect structure containing no critical nodes or central control elements. These requirments may be met by utilizing an interconnect system employing a data bus which is shared by all units each of which comprises a standard bus interface.

In a conventional large scale system, the interconnection of computers, processors, displays, and peripheral units requires a unique hierarchical arrangement where the function of a unit is determined by its position in the interconnecting topology. Moreover, the associated interfaces of any one type of unit would change, depending on its location in the topology. The conventional system contains a central computer connected to mini computers through interface units, which in turn communicate with peripherals, displays and communication equipment by way of specialized controllers.

To ensure continuous operation when unit failures occur, the conventional system is redundant, in that a plurality of complete systems are provided to compensate for unit failures. As the number of units in the system increases, the number of point to point interconnections increases at a greater rate and so do the necessary interface units, cards, and cables. The configuration of the interconnecting elements in the topology may vary from system to system, and hence integration of these various systems is most complex.

To circumvent some of the problems associated with this conventional type of system, a single multiplexed data bus may be employed to interconnect each of the units in the system. The central computer may be eliminated by utilizing distributed processing. The computer units are required to interface only with the data bus. Any computer may perform any role in the system since each computer is connected directly to all other computers, peripherals and displays by way of the multiplexed data bus. Continued operation during the failure of a unit only requires an additional backup unit. The result is reduction in the types and numbers of units in the system, and the number of interface cards per unit. As a result, acquisition and life cycle costs are reduced because inventory and maintenance requirements are alleviated.

Multiplexed data buses are currently available, and include those defined in MIL-STD-1553 and IEEE 488 specifications. Although circuitry to employ such data buses may be integrated into a particular unit to provide for standarization, the performance of these data buses in terms of bit rate, transmission distance, and number of units which may be connected to the bus have generally proved inadequate. On the other hand, current high performance bus circuitry is so complex that imbedding the bus interface circuitry into all of the units of a system is impractical. In general, existing bus control architecture designs are unacceptable because control resides in a bus controller or interconnect that represents a critical node.

In any multiplexed bus scheme, the problem arises as to which unit should transfer data along the data bus at any one time. In prior art systems, the determination of the next unit to transmit is accomplished by one of three methods: central control; contention; or token passing. Existing multiplexed bus schemes using central control, such as MIL-STD-1553, solve this problem by designating a particular bus interface as the bus controller and this bus interface controls the transmission by the other bus interfaces on the multiplexed bus. If the bus controller fails, the entire data bus is rendered inoperative.

Using a contention scheme, the need for central control is eliminated by allowing bus interfaces to transmit any time the multiplexed bus is idle. When more than one bus interface is waiting for the bus to become idle, the possibility exists that two or more signals may be transmitted at substantially the same time, and hence colliding with one another on the data bus. In essence each signal jams the other and hence the transmission is garbled and unusable. The occurance of collision slows down system operating speed. In systems which are operating at extremely high data rates, this collision problem is a limit on the system operational speed.

In order to eleviate the problems of contention, systems have been designed which pass a control word, or token, containing a sequence identifier, along the data bus. A token identification is assigned to each unit, allowing each unit to recognize and accept its token. Upon accepting the token, that bus interface must pass the token to the next bus interface after transmitting its data (if any) by transmitting a token with the identifier of the next bus interface in the sequence. In this manner access to the bus for the purpose of transmitting data is sequentially passed from bus interface to bus interface. However, in prior token passing schemes, the disabling or loss of a unit on the bus results in the disruption of the multiplexing and in essence the token gets lost and data can not be transmitted.

Thus, it would be an improvement in the data transmission art to provide a method of transmission control which allows the addition or deletion of units from the system without interruption of data transmission. It would also be an improvement in the art to provide a data bus which does not require the use of a designated unit to control data transmission through the bus.

SUMMARY OF THE INVENTION

In order to overcome the problems of the prior art, the present invention provides for a method of obtaining access to a serial multiplexed data bus which avoids contention problems and which allows for the addition or deletion of units from the bus without interrupting data bus operation. The invention comprises a method of utilizing a data bus to transmit data between a plurality of data processing units coupled to the bus. The method employs a control signal containing a control signal including an identifying number which identifies a unit coupled to the bus which is to obtain access to the bus. Each unit has a sequence number which identifies that particular unit in an ordered sequence of units.

The method utilized by each unit comprises the steps of monitoring the data bus for the control words and obtaining access to the bus when a control word is received containing an identifying number equal to its sequence number. The unit then has access to the data bus and transmits data thereover as required. The unit relinquishes access to the bus by transmitting a control word containing an identifying number which is changed by a predetermined value from the sequence number of the unit.

The improvement provided by the present invention comprises a method which automatically self-assigns and re-assigns the sequence numbers of the units coupled to the data bus. The ordered sequence of units is automatically and continuously maintained irrespective of units being added to or deleted from the data bus.

The self-assigning step comprises monitoring the data bus for control words when the unit is initially activated on the data bus. The unit then self-assigns a sequence number contained in each received control word until a bus timeout has occurred. A bus timeout is a predetermined time interval when data is not being transmitted over the data bus. The unit thus obtains the last sequence number in the sequential order of units coupled to the data bus. The first unit coupled to the bus self-assigns the first sequence number in the sequential order.

Each unit monitors the bus for bus timeouts, and when one occurs, the unit having the first sequence number in the ordered sequence obtains access to the data bus. The units also monitor the data bus after having gained access thereto. A unit re-assigns its self-assigned sequence number if a control word containing its sequence number has not been received prior to a predetermined number of bus timeouts. The re assigning process causes all units not gaining access to the data bus during one cycle through the ordered sequence to change their sequence nubmers to maintain the ordered sequence. Thus, the deletion or disabling of a unit causes units remaining in the ordered sequence who have not gained access to the data bus during the cycle to close the gap in the ordered sequence. These units then obtain access on the next cycle. The method provides for the passing of a control word, or token, between units in a sequence determined by a self-adjusted sequence number independently maintained by each unit. The sequence number is automatically and independently maintained in each unit and access is gained to the bus by accepting a token containing a token number (identifying number) equal to the sequence number of the unit. Transmission by way of the bus is relinquished by transmitting a token containing a token number equal to the unit's sequence number incremented by a predetermined value (usually 1). In this manner, each unit uses the bus to transmit data without collisions between data transmitted by several units, or the need for a bus controller. The addition or deletion of units to the data bus does not interrupt bus operation or require manual intervention or assistance from the added units.

More specifically, each unit gains access to the bus in a fixed sequence and relinquishes the bus by transmitting the token containing an incremented token number which is greater than its sequence number. Each unit remembers its sequence number in the cycle and gains access to the bus when it receives a token containing a token number equal to its sequence number. Upon gaining access to the bus, the unit may transmit a message and then relinquish the bus by transmitting a token containing a token number equal to its sequence number plus one. In this manner, each unit gets its turn at using the bus without collisons between messages transmitted by several units or the need for a bus controller.

The allocation of bus time is automatically adjusted to the demand because messages are of variable length, and each unit uses only that bus time required for transmission of the message followed by the token (with incremented token number). To avoid the situation where one unit denies others access to the bus for an excessive period by transmitting too long a message, long transfers may be segmented into a series of shorter messages thus relinquishing access to others between segments.

Since there is no master unit or bus controller to fail, the bus is immune to single point failures. If a unit failure results in a unit not transmitting during its turn at the bus, a timeout, or time period of predetermined length when no unit is transmitting over the bus, detected by all units on the bus causes the first unit in sequence to assume bus access, and all units not receiving the token then decrement their sequence number to avoid a timeout on the next cycle. This provides the ability to detect and recover from the removal or failure of a unit without rendering the bus inoperative.

When power is first applied to a unit, the unit's bus interface finds its sequence number by monitoring the bus to determine the highest token number. The bus interface then accesses the bus by assuming a sequence number equal to the highest token number and transmitting upon receipt of a token with that token number. This allows units to be added or dropped from the bus without disrupting bus operation, without requiring either software control of bus access or manual intervention, and does not require the units to be involved in the adjustment of the token passing sequence.

BRIEF DESCRIPTION OF THE DRAWINGS

The various features and advantages of the present invention may be more readily understood with reference to the following detailed description taken in conjunction with the accompanying drawings, wherein like reference numerals designate like structural elements, and in which:

FIG. 5 is a diagram illustrating various signals associated with the bus interface of FIG. 2.

DETAILED DESCRIPTION OF THE INVENTION

Figure 1:
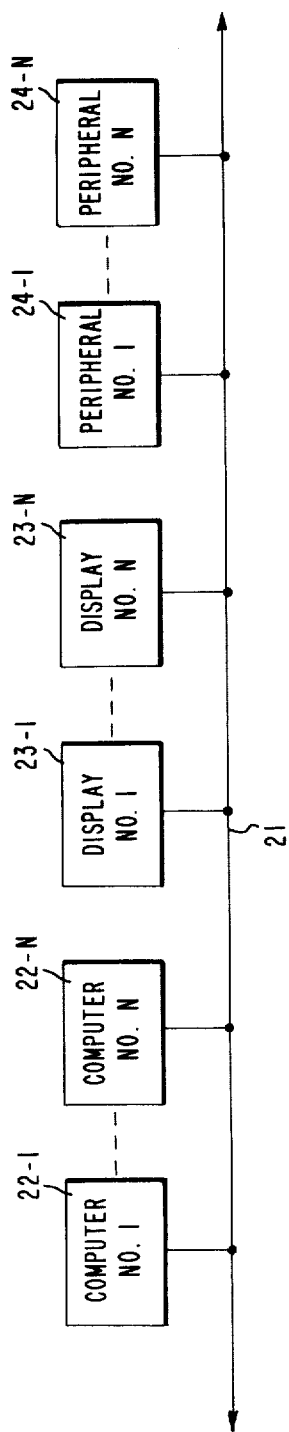
FIG. 1 illustrates a serial multiplexed data bus system employing the principles of the present invention.

Referring to FIG. 1 there is shown a multiplexed data bus in which the present invention may be employed. The system includes a serial data bus 21 to which is coupled a plurality of units, such as computers, displays, and peripherals. For example, a plurality of computers 22-1, . . . 22-n, a plurality of displays 23-1, . . . 23-n, and a plurality of peripherals 24-1, 24-n may be connected to the data bus 21. The data bus 21 may be a typical coaxial on triaxial cable with a center conductor surrounded by one or two grounded shelds and appropriate transformer couplings to connect the computers, displays, and peripherals thereto. The computers 22 connected to the data bus 21 may be of the same or dissimilar type. The displays 23 may be text, graphics, or large screen, or the like. The peripherals 24 include such items as terminals (CRT/keyboards), modems, printers, disks, and magnetic tapes, or the like.

Each of the units connected to the data bus 21 transmits information along the bus 21 to any of the other units. For example, the first computer 22-1 may transmit information to any of the other computers coupled to the bus 21, or transmit information to any of the peripherals 24, or any of the displays 23. In a large system configuration, it is possible for many units to attempt to transmit data along the data bus 21 at the same time. The passing of a control word, or token, between bus interfaces allows all of these units to share the transmission path in a sequential time-shared multiplexed manner.

In any non-contention system with multiple units coupled to the data bus 21, only one unit is allowed to transmit at any given instant in time. To avoid the contention problem and gain access to the bus 21, each particular unit attached to the bus 21 is provided with a bus interface. This bus interface assists in implementing the method of the present invention.

Figure 2:
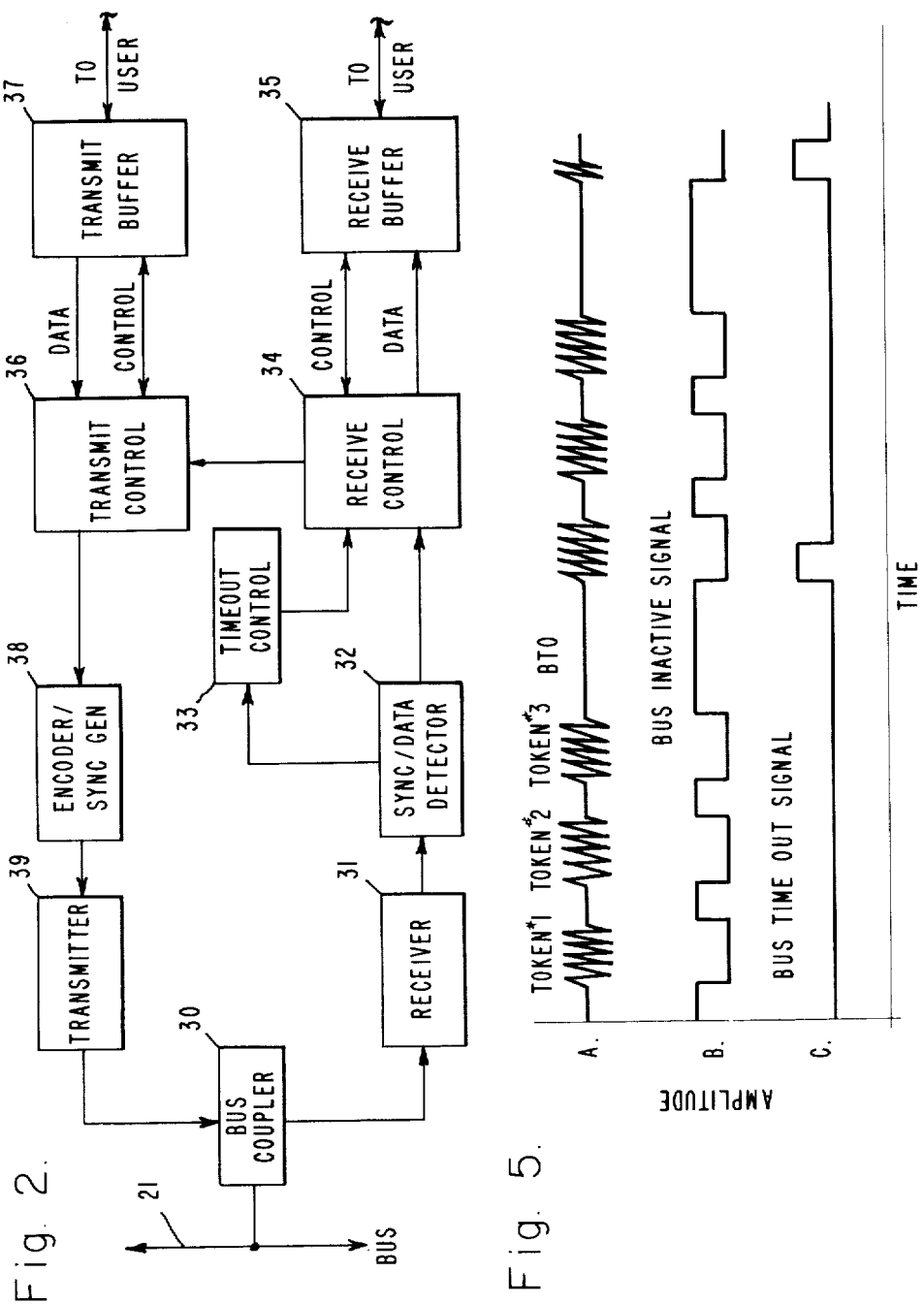
FIG. 2 is a block diagram illustrating a typical bus interface.

FIG. 2 shows a block diagram of a typical bus interface. The bus interface is coupled to the transmission line of the data bus 21 through a bus coupler 30, which is generally comprised of an isolation transformer which presents a high impedance, short stub to the transmission line. The bus interface is split into two basic portions, a receiver portion and transmitter portion. The bus coupler 30 is connected to a receiver 31 which allows the receiver 31 to sense signals as they propagate past the coupler 30 on the data bus 21. The sensed signal is amplified and conditioned by the receiver 31 and applied to the sync/data detector 32. The presence of a sync pulse in an incoming signal is detected by sync/data detector 32 which converts the bits of information following the sync pulse from an encoded waveform to a decoded serial bit stream. A serial to parallel converter in the sync/data detector 32 converts the serial bit stream into parallel words which are presented to receive control circuitry 34 for interpretation. The receive control 34 distinguishes control words from data words and decodes control words to determine if the received information is a token, the beginning of a message, or status. The receive control circitry 34 maintains a unit's sequence number and compares the token number of all received token words with its sequence number to determine if it has access to the bus. Receive control 34 activates transmit control circuitry 36 when that bus interface holds the token and has access to the data bus. The receive control circuitry 34 also maintains one or more receive addresses and compares the message address of all received messages against its receive address(es) to determine whether to accept or reject the message. When a message is accepted, the receive control circuitry 34 controls the flow of the data words to the user (computer, terminal, etc.) through receive buffer circuitry 35. The receive control circuitry 34 only accepts status words from the bus and passes them to the user if the transmit control 36 has transmitted a message requesting a status reply. The sync detector 32 is also coupled to timeout control circuitry 33 and provides a bus inactive signal thereto. The timeout control circuitry 33 monitors the data bus 21 for bus timeouts and provides appropriate signals to the receive control circuitry 34.

The transmitter portion of the bus interface comprises transmit control circuitry 36 and transmit buffer circuitry 37 which controls the data flow from the user. An encoder/sync generator 38 converts parallel words from the user into a serial bit stream, encodes the waveform of the bit stream, and interjects sync pulses into the signals to be transmitted. The output of the encoder/sync generator 38 is connected through a transmitter 39 to the bus. The transmitter 39 transmits the signal over the data bus 21 by way of the bus coupler 30.

Information is transmitted over the data bus in the form of a control word or a message containing control words and data words. A typical control word might be a token, which is utilized to determine bus access by a particular bus interface. Another control word is a status word, which is used to determine if a transmitted message has been properly received. A data transmission message is generally comprised of a beginning of message control word, the data words, and an end of message control word. All transmitted control words are preceeded by a sync pulse, and contain appropriate control codes to insure proper addressing and action at the receiving unit. The use of control words in bit fields of words is well-known in the computer art and will not be detailed herein.

In operation, the transmitted signal from a bus interface propagates away from the unit in both directions along the bus 21 and dissipates at each end of the transmission path in a terminator (impedance matching resistor). As the signal passes each bus interface along the bus 21, the signal is sensed or received by each bus interface. Both control words of various types and data words are transmitted in a bit serial form over a single path carried by the same signal. A transmitted signal starts with a sync pulse or code followed by a control word. A code within this control word indicates whether the transmission is a token, a message, or a status reply allowing all bus interfaces to react accordingly upon receiving the signal. A token control word contains a token number which is used upon reception by all bus interfaces to determine whether to accept or disregard the token. Normally only one bus interface accepts a transmitted token and thereby holds the token in the token passing scheme.

Only the bus interface holding the token has bus access and can transmit data from its unit to another unit or units. This data is transmitted as a continuous bit stream in the form of a message or packet beginning with a control word of a different type than a token, followed by a variable number of data words, and ending with a sync pulse and control word to indicate the end of the transmitted message. The beginning control word contains an address. Although all units receive every transmitted message, only the bus interface(s) addressed by the beginning of message control word accept and transfer the data to their units.

After transmitting a message, the transmitting bus interface still holds the token and has access to the bus. If status is requested from the addressed bus interface by setting a bit in the end of message control word, the transmitting bus interface holds the token until a status reply word is sent back from the addressed bus interface. A status reply is the only condition whereby a signal is transmitted by a bus interface that does not hold the token. Under this condition, the bus interface holding the token is the only receiver to accept the control word. After receiving the status reply (if requested) or immediately following the end of message control word (if not requested), the bus interface relinquishes the bus by transmitting a token, thereby passing the token.

The method of the present invention is implemented by allowing each bus interface to establish a sequence number, and receive and compare control words (tokens) containing token numbers with its own sequence number. The bus interface monitors the data bus 21 for bus time-outs, that is, times when the data bus 21 does not have any data transmitted thereover, and adjust its sequence number, when necessary, according to a set of rules that are the same for all units coupled to the bus 21. The set of rules for both normal and abnormal conditions are described hereinbelow along with an explanation of how fail-safe operation is achieved under distributed control in the presence of transmission errors and abnormal bus interface operation due to bus interface failure.

Figure 3:
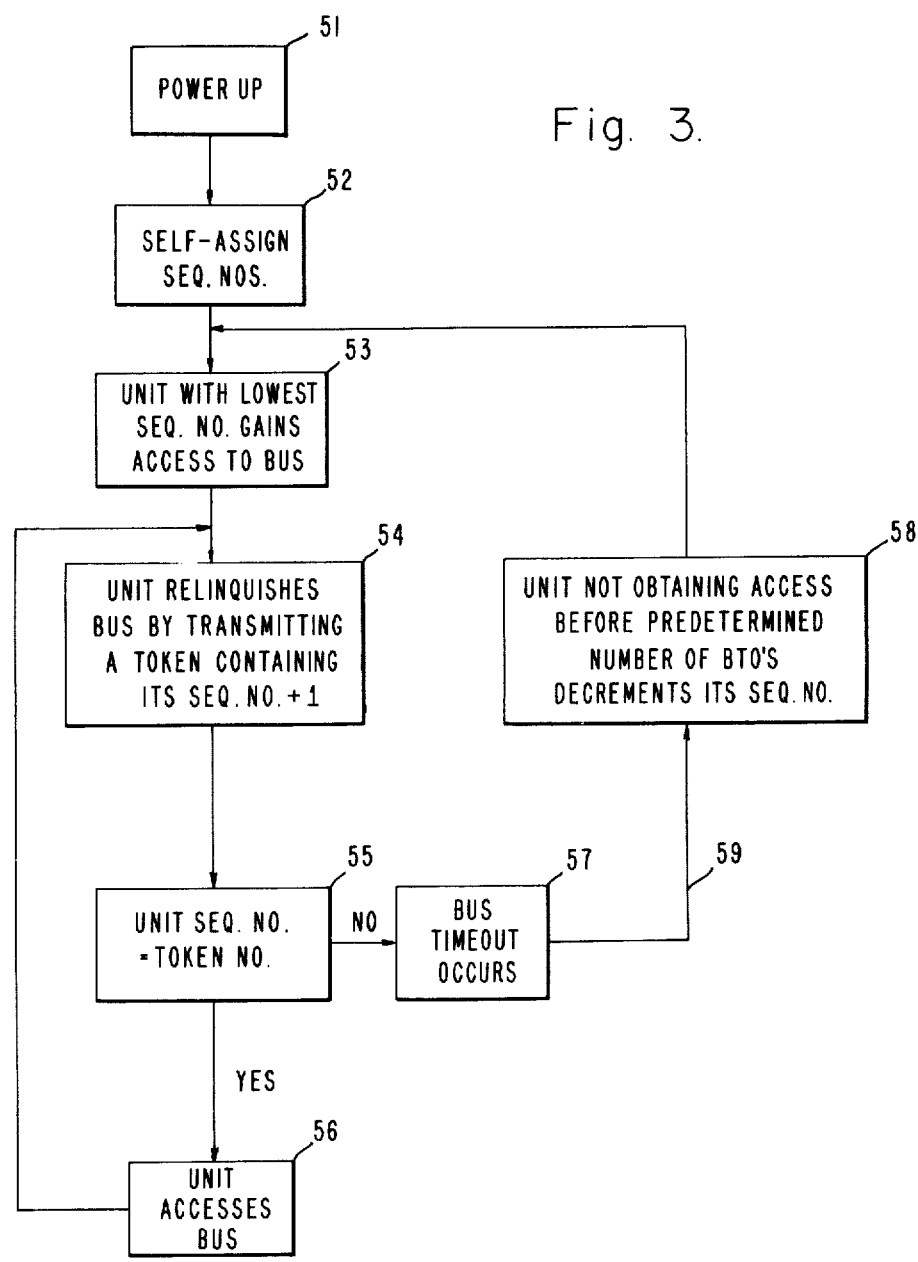
FIG. 3 is a flow-diagram illustrating the access method of the present invention which may be utilized with the multiplexed data bus of FIG. 1.

FIG. 3 shows a flow diagram which is useful in illustrating the method of the present invention. The general flow is such that initially, when power is applied to a unit as indicated in box 51, that unit self-assigns its own sequence number, as indicated in box 52. The unit with the sequence number of zero, has immediate access to the data bus after a bus timeout has occurred and may initiate a bus transaction, as indicated in box 53. Typically, the first unit to receive power is the unit with a sequence number of zero.

After completing a bus transaction, the unit relinquishes access to the bus by transmitting a token containing a token number equal to its sequence number plus one as indicated in box 54. When a unit is not required to make a bus transaction, the bus is still relinquished by transmitting the token with incremented token number. Once the token is transmitted over the bus, all units monitor the bus for a token number equal to their sequence number. If the token number is recognized by another unit, it gains access to the bus, as indicated in boxes 55 and 56. If, however, no unit has a sequence number equal to the token number, there is a bus timeout as indicated in box 57, and the system recycles to the unit having a zero sequence number, as indicated by loop 59.

At this time, all units not gaining access to the bus for a predetermined number of consecutive cycles decrement their self-assigned sequence numbers by one, as indicated in box 58. The transmission cycle repeats with all units eventually gaining access to the bus, since eventually the sequence numbers will be in numerical order for all units coupled to the data bus. Typically the number of consecutive cycles without access is two before decrementing a units sequence number.

If a unit fails, a bus timeout occurs before the end of a cycle, and those units having higher sequence numbers decrement the sequence numbers to close the gap. This ensures continued operation on the next cycle. By requiring two or more consecutive cycles without access before decrementing the higher sequence numbers, the loss of a token due to a transmission error does not result in a needless attempt to close the gap.

A newly added unit self-assigns its sequence number as indicated in box 52 by assuming a sequence number equal to the token number contained in the token transmitted just prior to a bus timeout, which normally occurs at the end of a cycle. Thus the newly added unit is added to the end of the sequence, since this unit has the highest sequence number in the cycle. This unit is then able to transmit on the next cycle.

Under normal conditions, each unit is given access to the shared data bus by sequentially passing the token from bus interface to bus interface. Each unit retains a sequence number corresponding to the order in which the token is passed. All bus interface units receive the transmitted token, but only the unit that has a sequence number equal to the token number present in the received token will accept it. Only upon acceptance of a token can a bus interface initiate a bus transaction and transmit information along the bus. If a particular unit is not required to initiate a transaction, the bus interface associated therewith immediately relinquishes the data bus after accepting the token, by passing the token with an incremented token number. If, however, a bus transaction is required by the unit, the bus interface unit relinquishes the bus only after completing the bus transaction. Here again, bus access is relinquished by transmitting a token containing the incremented token number, which is the unit's sequence number plus one.

When any bus interface in the sequence attempts to pass the token to the next higher bus interface in the sequence, and no bus interface begins transmitting, all bus interfaces will detect a bus timeout. Accordingly, the bus interface with a sequence number of zero assumes the token and starts transmitting. This routinely occurs when the bus interface with the highest sequence number attempts to pass the token and there is no higher bus interface to accept it. If a token is lost due to a transmission error, then a bus timeout occurs in the middle of a sequence and the bus interface with a sequence number of zero restarts the sequence.

When a unit is initially powered up, or a unit becomes enabled, the bus interface unit associated therewith self-assigns its own sequence number by setting its sequence number counter equal to the token number contained in the token received just prior for a bus timeout. If a token is not received prior to a bus timeout, the sequence number of the bus interface unit remains set to zero. After a random number of bus timeouts have occurred, the bus interface unit accepts the next token with a token number equal to its self-assigned sequence number and starts transmitting. The random number of bus timeouts is chosen so as to avoid more than one unit self-assigning the same sequence number after a simultaneous turn-on or enable of two or more units. In this manner, additional units may be added to the bus without disrupting bus operation. Each newly added unit automatically assumes the next highest sequence number in the sequence. If there are no other bus interfaces on the bus, the newly added unit assumes a sequence number of zero and passes a token containing a token number of one.

Once a bus interface has self-assigned its sequence number and transmits the token, its sequence number does not change except under the following condition. A bus interface with a non-zero sequence number decrements its sequence number by one when a bus timeout occurs if a token containing a token number equal to its sequence number has not been received since the previous two bus timeouts. If a bus interface decrements its sequence number to zero after a bus timeout, the bus interface acquires the token and starts transmitting. The decrementing of the sequence number causes all bus interfaces not accepting tokens to continue to reduce their sequence numbers every other bus timeout until they receive a token equal to their sequence number, or their sequence number decrements to zero, or for some reason a collision occurs. A collision occurs when two bus interfaces simultaneously transmit data along the bus. If a bus timeout occurs at some time other than the end of the sequence because a bus interface is disabled, the sequence number adjustment rule ensures continuous transmittal of tokens from unit to unit, in that it closes up the gap in the sequence. A unit may become disabled by numerous conditions including a command, deactivation of safeguard circuitry in the bus interface, the detection of a collision, failure in a bus interface, power turnoff in a unit, or removal of a unit from the data bus.

When a unit is transmitting, its bus interface monitors for the presence of another unit simultaneously transmitting along the data bus. This abnormal condition is referred to as a collision and causes the unit to disable, and then enable itself, thus self-assigning a new sequence number as described above. This protects against the unlikely event of two units having the same sequence number for some abnormal reason.

A bus interface will not accept a token more than once between bus timeouts. This protects against the unlikely event of receiving a token from two or more units because they have the same sequence number or one of the units has failed in such a way that it is transmitting a token containing an improper token number.

The above-described method of automatic sequence assignment and bus access is illustrated in Table I which is a state transition matrix. The bus interface can only be in one state at any given time as determined by the answer to the questions in the upper half of Table I. The combination of yes or no answers to these questions determines the particular state of the bus interface. When the bus interface transitions from one state to another because the answer to one or more of these questions has changed, action is taken as indicated by an X marked in the column corresponding to the new state. This action may then result in changing the answer to one or more of the questions.

The first three states (1-3) correspond to establishing a sequence number which must preceed bus access and normally occurs only once at unit power up. The next two states correspond to bus access with state 4 applying to all subsequent units in the sequence (sequence number unequal to zero) and state 5 applying to the first bus interface in the sequence (sequence number equals zero). The last three states correspond to adjustment of the sequence number under abnormal conditions. State 6 is the normal situation where the token is passed prior to a bus timeout and no adjustment occurs. State 7 corresponds to a condition where the token was not accepted prior to the latest timeout, but was received prior to the previous bus timeout, thus requiring no adjustment. State 8 corresponds to the situation where the token was not accepted prior to the second consecutive bus timeout resulting in the sequence number being decremented by one.

Figure 4:
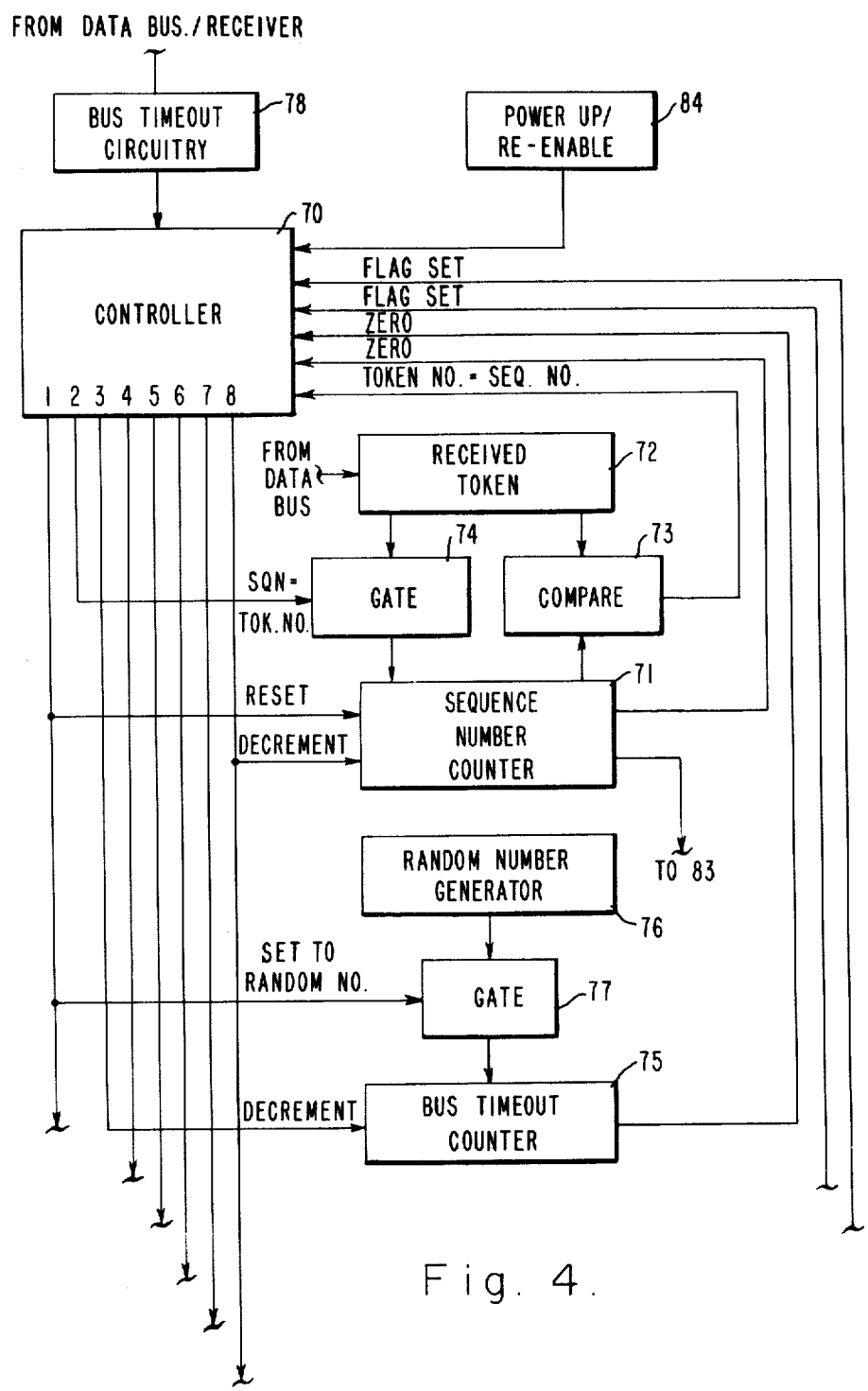
FIG. 4 is a block diagram illustrating a portion of the bus interface of FIG. 2.
Figure 4A:
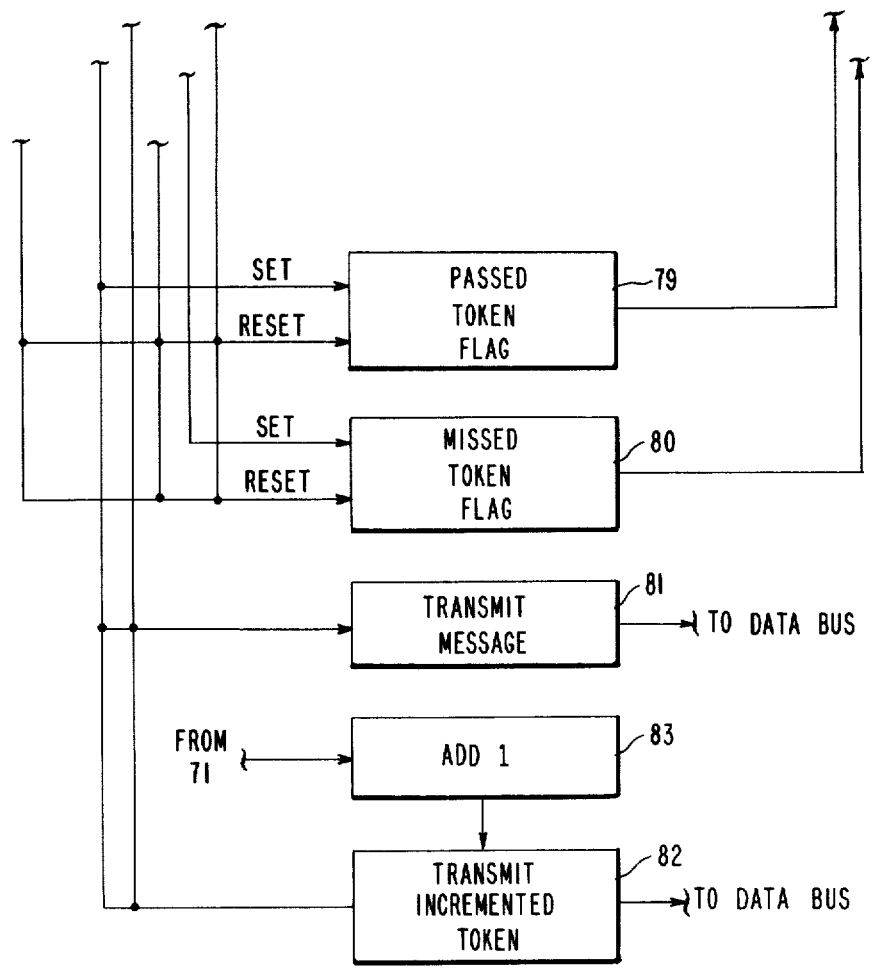

Referring to FIG. 4, a block diagram of a portion of the bus interface of FIG. 2 is shown, which illustrates the various circuits required to perform the operations indicates in Table I. A controller 70, which may comprise a plurality of logic gates, registers, and read-only-memory is employed to provide the output signals constituting the eight states in Table I. The input signals from the other circuits constitute the answer to the questions in Table I. That is to say, the logical output (1 or 0) of these circuits corresponds to the yes or no answer to the question. Based on these signals, the controller 70 activates one of its output signals according to the state transition matrix in Table I.

A sequence number counter 71, is coupled through a gate 74 to received token circuitry 72. The sequence number counter 71 is set equal to the token number in the received token circuit 72 when gate 74 is activated. The received token circuitry 72 accepts tokens from the data bus and stores the token number of the last token received. Comparison circuitry 73 is connected to the sequence number counter 71 and the received token circuitry 72. The comparison circuitry 73 compares values of signals applied thereto and provides an output feedback signal to the controller 70 when the received token number equals the sequence number of the bus interface. A bus timeout counter 75 and its associated random number generator 76 and gate circuit 77 is provided to count bus timeouts. Signals from the controller 70 cause these circuits to count a random number of bus timeouts and thereafter provide a feedback signal to the controller 70.

Circuitry is provided to control the setting and resetting of flags in order to determine if the bus interface gains bus access prior to a bus timeout. A passed token flag circuit 79 and a missed token flag circuit 80 are provided which generate signals indicative of whether or not a token has been received by the bus interface. Circuitry 81 is provided to control the access of the data bus by the unit (computer, perpheral, etc.) to which the bus interface is attached. This circuitry controls the access and duration of the unit on the bus in order for the unit to transmit messages and receive status replies.

Token transmission circuitry 82 is also provided which transmits a token containing a token number one greater than the sequence number of the bus interface. This allows a unit to relinquish control of the data bus. Add circuitry 83 is coupled to the sequence number counter 71 and receives sequence numbers therefrom, and adds one therto, to provide the token number to be transmitted. Power-up and re-enable circuitry 84 provides a signal to the controller 70 to initialize the assigning of a new sequence number. This circuitry 84 provides a pulse to the controller 70 when power is turned on, when a collision occurs during transmission by that bus interface, or when an enable command is received from the bus or its connected unit.

Various feedback signals from the counters 71, 75 and flag setting circuits 79, 80 and comparison circuitry 73 are provided, to the controller 70. Also included are signals of from the output from the bus timeout circuitry 78 and the power-up/re-enable circuitry 84. These feedback signals are provided in order to perform all the operations indicated in Table I.

In operation, the sequence number may be maintained in a register or counter 71 and is set to the token number of a received token or compared with the token number in the comparison circuitry 73 to determine if the two numbers are equal (an input condition to the controller 70). Likewise, the bus timeout counter 75 is set to a random number from the random number generator 76 and decremented by controller 70 until the bus timeout counter 75 decrements to zero (an input condition to the controller 70).

The bus timeout circuitry 78 monitors the bus for a loss of signal, and provides a bus timeout pulse as an input to the controller 70, when the period of inactivity is equal to a predetermined bus timeout interval. This interval is measured by an elapsed time counter in the bus timeout circuitry 78, which starts at the beginning of inactivity periods and resets during active periods. If activity resumes before the bus timeout interval, the elapsed time counter is reset and no bus timeout pulse is generated. If, on the other hand, the bus remains inactive for a period longer than a bus timeout interval, the elapsed time counter generates a bus timeout pulse, recycles, begins to count again, and continues to generate a bus timeout pulse each time another bus timeout interval elapses. In other words, during long periods of bus inactivity, contiguous bus timeout intervals can occur, with successive bus timeout pulses generated. This normally happens when the system is first powered up.

FIG. 5 shows graphs illustrating the above-mentioned signals. FIG. 5(a) represents three tokens being passed along the data bus. FIG. 5(b) shows the bus inactive signal which is high during time periods when the bus is inactive. FIG. 5(c) shows the bus timeout pulse provided upon the occurrence of a bus timeout.

An elapsed time clock is utilized to measure an elapsed time interval greater than the round trip signal propagation time (from one end of the bus to the other end and back) plus the reaction time of a bus interface. The reaction time is the inactive time from the end of a received signal to the start of the subsequent transmitted signal as measured at the coupling point of the transmitting bus interface. The propagation time is typically five nanoseconds per meter and the reaction time is typically one microsecond. In practice, the elapse time clock is set to ten times L plus three microseconds, where L is the end-to end length of the bus transmission path in kilometers.

The passed token flag and missed token flag circuits 79, 80 are comprised of a pair of flip-flop circuits which are set and reset by outputs of the controller 70 to determine whether or not that particular bus interface achieved bus access (passed the token) prior to the last bus timeout. The state of these flags provides an input condition to the controller 70.

The message transmission control circuitry 81 in the bus interface provides an output port from the unit (computer, display, peripheral, etc.) and enables the transmission of a message from the unit to correspond with acquiring bus access.

With reference to both FIG. 4 and Table I, the eight states of Table I are described hereinafter. State 1 is the power-up or re-enable condition. At this time, the sequence number counter 71 is reset to zero, and the bus timeout counter 75 is set to a random number greater than two. Both the passed-token flag and missed-token flag circuits 79, 80 are reset. The bus interface unit then awaits receipt of tokens transmitted along the data bus and the occurrence of bus timeouts.

Upon receipt of a token transmitted along the bus, state 2 is in effect, wherein the sequence number counter 71 is set to the token number contained in the received token. The sequence number counter 71 continues to set its value equal to the token number contained in each received token until a bus timeout occurred. Once this has happened, the last received token number becomes the sequence number of the bus interface.

State 3 is in effect when a bus timeout has occurred and the bus timeout counter 75 has not decremented to zero. At this time, the bus timeout counter 75 is decremented by one. If the bus timeout counter 75 is zero after decrementing, a bus interface advances to either state 4 or 5, and never enters states 2 and 3 again unless re-enabled by state 1 by some abnormal condition.

The first bus interface to establish its sequence number is never in state 2, because there are no tokens to receive. Consequently, the first bus interface in the sequence stays in state 3 until a sufficient number of bus timeouts have occurred to decrement its bus timeout counter 75 to zero, and then advances to state 5 with its sequence number remaining zero. In state 5, this bus interface which has a sequence number of zero, assumes the receipt of token number zero at the time of the bus timeout and transmits a token with token number one. The token is preceded by the transmission of a message(s) if the unit has any to send. In this way the cycling of the bus is started with each bus time-out followed by the token passing.

Subsequent bus interfaces establish their sequence numbers (non-zero) by entering state 2, which allows them to set their sequence numbers equal to the highest token number on the bus. When the bus timeout counter 75 goes to zero in state 3, these bus interfaces advance to state 4. In state 4, which deals with bus interfaces having non-zero sequence numbers, a bus interface may gain access to the data bus and allow its associated unit to transmit data upon receiving a token with a token number equal to its sequence number. Once a unit has accessed the data bus, its bus interface relinguishes the bus by transmitting a token containing a token number which is equal to its sequence number plus one.

States 6, 7, and 8 apply to bus interfaces with non-zero sequence numbers and control the adjustment of the sequence number when a bus timeout occurs. State 6 indicates the conditions and actions which occur during normal token transfer from unit to unit. Under normal conditions, no adjustment of the unit's sequence number is required. State 7 corresponds to a situation where the bus interface missed the token prior to a bus timeout, but not prior to the previous bus timeout. No sequence number adjustment occurs at this time, but the missed token flag is set. State 8 corresponds to the situation where two bus timeouts have occurred and a unit has not received a token with a token number matching its sequence number. Under this condition, the sequence number of the unit is decremented by one. This is performed in the sequence number counter 71. The passed-token and missed-token flags are then reset after the sequence number has been changed.

Thus, there has been described a new and improved access method for use with a multiplexed, single-signal data bus. This data transmission control method avoids simultaneous data transmissions from several units connected to the data bus. Units may be added or deleted from the bus without disruption of data transmission. Also, no independent bus controller is required to control data transmission over the data bus.

It is to be understood that the above-described embodiment is merely illustrative of one of the many specific embodiments which represent applications of the principles of the present invention. Clearly, numerous and varied other arrangements may be readily devised

TABLE I

|  | State |  |  |  |  |  |  |  |
| --- | --- | --- | --- | --- | --- | --- | --- | --- |
|  | 1 | 2 | 3 | 4 | 5 | 6 | 7 | 8 |
| CONDITIONS |  |  |  |  |  |  |  |  |
| POWER-UP OR RE-ENABLED? | YES | NO | NO | NO | NO | NO | NO | NO |
| BTO COUNTER = ZERO? | — | NO | NO | YES | YES | YES | YES | YES |
| TOKEN NO. RCV'D = SQN | — | NO | — | YES | — | — | — | — |
| BTO OCCURRED? | — | — | YES | — | YES | YES | YES | YES |
| SQN = ZERO? | — | — | — | — | YES | NO | NO | NO |
| PASSED-TOKEN FLAG SET? | — | — | — | NO | — | YES | NO | NO |
| MISSED-TOKEN FLAG SET? | — | — | — | — | — | — | NO | YES |
| ACTION |  |  |  |  |  |  |  |  |
| SEQUENCE NUMBER: |  |  |  |  |  |  |  |  |
| RESET TO ZERO | X |  |  |  |  |  |  |  |
| SET TO TOKEN SQN |  | X |  |  |  |  |  |  |
| DECREMENT BY ONE |  |  |  |  |  |  |  | X |
| BUS TIMEOUT COUNTER: |  |  |  |  |  |  |  |  |
| SET TO RANDOM NO. | X |  |  |  |  |  |  |  |
| DECREMENT BY ONE |  |  | X |  |  |  |  |  |
| PASSED TOKEN FLAG: |  |  |  |  |  |  |  |  |
| SET |  |  |  | X |  |  |  |  |
| RESET | X |  |  |  |  | X |  | X |
| MISSED-TOKEN FLAG: |  |  |  |  |  |  |  |  |
| SET |  |  |  |  |  |  | X |  |
| RESET | X |  |  |  |  | X |  | X |
| TRANSMIT MSG (if any) |  |  |  | X | X |  |  |  |
| TRANSMIT TOKEN = SQN + 1 |  |  |  | X | X |  |  |  |

NOTE:
SQN = SEQUENCE NUMBER
BTO = BUS TIMEOUT
— = IRRELEVANT
X = PERFORM ACTION

What is claimed is:

1. A method of utilizing a data bus to transmit data between a plurality of data processing units coupled thereto, said method employing a control signal containing a control word including an identifying number which identifies a unit coupled to the bus which is to gain access to the bus, each unit having a sequence number associated therewith which identifies that particular unit in an ordered sequence of units which gain access according to said ordered sequence, said method utilized by each of said units comprising the steps of monitoring said data bus for said control words, and obtaining access to said data bus when a control word is received containing an identifying number equal to the sequence number of the unit, transmitting over said data bus as required, and relinquishing access to said data bus by transmitting a control word containing an identifying number which is changed by a predetermined value from the sequence number of said unit, wherein the improvement comprises:

self-assigning and re-assigning the sequence number of said unit in a continuous manner so as to maintain said ordered sequence of units irrespective of other units being added to or deleted from said data bus.

2. The method of claim 1 wherein said self-assigning process further comprises the step of:

self-assigning the first sequence number in said ordered sequence when a unit is the first unit to be activated on said data bus.

3. The method of claim 2 which further comprises the step of:

monitoring said data bus for bus timeouts, whereafter the occurrence of a bus timeout causes said unit having said first sequence number to obtain access to said data bus.

4. The method of claim 2 which further comprises the step of:

monitoring said data bus for said control words when said unit is initially activated on said data bus;

self-assigning a sequence number to said unit which is equal to the identifying number contained in each control word received by said unit until the occurrence of a bus timeout (a predetermined time interval when data is not being transmitted);

said unit thus obtaining the last sequence number in said sequential order of units.

5. The method of claim 2 which further comprises the steps of:

monitoring said data bus for said bus timeouts after having gained access to said data bus; and re-assigning said self-assigned sequence number if a control word containing its sequence numer has not been received prior to a predetermined number of bus timouts;

said re-assigning being such that all units not receiving a control word containing their sequence numbers during one cycle through said ordered sequence change their sequence numbers to maintain said ordered sequence;

whereby the deletion or disabling of a unit causes units remaining in the ordered sequence who have not obtained access during the cycle to close the gap in the ordered sequence.

6. The method of claim 2 wherein:

said first sequence number in said ordered sequence is zero.

7. A method of coupling a plurality of data processing units to a common data transmission bus to transmit data thereover, comprising:
   providing a token number on the data transmission bus corresponding to the sequence number of the transmitting data processing unit changed by a predetermined amount;
   self-assigning random bus time-out counts at each of said plurality of data processing units;
   providing a bus time-out period at the end of each token number transmission over said data transmission bus during which there is no transmission activity on said data transmission bus;
   monitoring the token number and self assigning a sequence number corresponding to the token number at each of said plurality of data processing units, while decrementing the bus time-out count one count at each of said plurality of data processing units upon the occurrence of each bus time-out period until a predetermined minimum bus time-out count is reached; and
   thereafter each of said plurality of data processing units, upon reaching said predetermined minimum bus time-out count, transmitting a token number corresponding to its self assigned sequence number changed by said predetermined amount.

8. The method of claim 7 comprising:
   changing the sequence number, by said predetermined amount, at each of said plurality of data processing units having said predetermined minimum bus time-out count, after a predetermined number of bus time-out periods during which there is a lack of correspondence between the transmitted token number and the sequence number at said each of said plurality of data processing units.

9. The method of claim 7 wherein:
   the token number is always increased by one.

10. The method of claim 8 wherein:
    said predetermined number of bus time-out periods is two.

11. The method of claim 8, wherein:
    the sequence number is decremented by one.

12. A method for data processing units coupled to a common data bus to obtain access to said data bus to transmit signals thereover, comprising:
   providing bus time out intervals during which no data is transmitted on said common data bus;
   self assigning a predetermined sequence number at each data processing unit;
   self assigning a random bus time-out count at each data processing unit;
   correspondingly changing the bus time-out count at each data processing unit upon the occurrence of each bus time-out interval unit one data processing unit reaches a predetermined bus time-out count; and
   utilizing said one data processing unit to transmit a signal on said data bus.

13. The method of claim 12 in which:
    said predetermined bus time-out count is zero.

14. A method for data processing units coupled to a common data bus to obtain access to said data bus to transmit signals thereover, comprising:
   providing bus time out intervals during which no data is transmitted on said common data bus;
   self assigning a predetermined sequence number at each data processing unit;
   self assigning a random bus time-out count at each data processing unit;
   correspondingly changing the bus time-out count at each data processing unit upon the occurrence of each bus time-out interval unit one data processing unit reaches a predetermined bus time-out count; and
   utilizing said one data processing unit to transmit a token number signal on said data bus indicative of said predetermined sequence number changed by a predetermined amount.

15. The method of claim 14, comprising:
   monitoring of said data bus by each remaining data processing unit;
   self assigning a sequence number corresponding to said token number signal by each remaining data processing unit;
   continuing correspondingly changing the bus time-out count at each remaining data processing unit upon the occurrence of each bus time-out interval until another data processing unit reaches said predetermined bus time out count; and
   utilizing said another data processing unit to transmit a different token number signal on said data bus indicative of said token number signal changed by said predetermined amount.

16. The method of claim 14, in which:
    said predetermined sequence number is increased by said predetermined amount.

17. The method of claim 14 in which:
    said predetermined sequence number is zero.

18. The method of claim 16, in which:
    said predetermined amount is one.

19. A method whereby a plurality of data processing units connected to a common data bus may maintain an ordered numerical rank of sequence numbers and close the gap should a data processing unit in the sequence cease to function, comprising:
   self assigning a sequence number at each data processing unit;
   establishing an ordered numerical rank of self assigned sequence numbers among said data processing units;
   transmitting token number signals by individual data processing units in a sequence according to the sequence number rank, each token number signal being incremented by a predetermined amount above the sequence number of the transmitting data processing unit;
   providing a bus time out interval at the end of each signal transmission cycle during which no signals are transmitted; and
   counting bus time out intervals by all data processing units, and those data processing units not receiving a token number signal within a predetermined number of bus time out intervals, decrementing their sequence numbers to maintain said ordered numerical rank of sequence numbers.

20. A method whereby a plurality of data processing units coupled to a common data bus are individually enabled to transmit signals at different times, comprising:
   self assigning sequence numbers at each data processing unit;
   establishing an ordered numerical rank of sequence numbers among said data processing units, the sequence numbers differing from those adjacent thereto in the rank by a predetermined amount; and transmitting token number signals by each data processing unit in a sequence according to sequence number rank, in which each transmitted token number signal represents the sequence number of the transmitting data processing unit changed by said predetermined amount.

21. A data bus system, comprising:

a data bus;

a plurality of data utilization units coupled to said data bus;

bus time-out means for producing bus time-out signals each indicative of an interval during which there are no transmissions on said data bus;

a bus time-out counter for each data utilization unit, responsive to said bus time-out signals for counting down said bus time-out counter;

means for setting each bus time-out counter to a different count;

a sequence number counter for each data utilization unit;

means for setting each sequence number counter to a predetermined count;

token number signal transmitting circuit means for each data utilization unit, coupled to said data bus; and means coupling said token number signal transmitting circuit means to said bus time-out counter and to said sequence number counter for causing said token number signal transmitting circuit to transmit a token number signal on said data bus when said bus time-out counter is at a predetermined minimum count.

22. Apparatus as set forth in claims 21, in which:

said predetermined count of said sequence number counter is zero.

23. Apparatus as set forth in claims 21, in which:

said predetermined minimum count of said bus time-out counter is zero.

24. Apparatus as set forth in claim 21, in which said token number signal transmitting circuit means, comprises:

a token number signal transmitting circuit coupled to said data bus and an incrementing circuit coupling said sequence number counter to said token number signal transmitting circuit for causing said token number signal transmitting circuit to transmit a token number signal on said data bus, representing said predetermined count of said sequence number counter incremented by a predetermined amount by said incrementing circuit, when said bus time-out counter is at said predetermind minimum count.

25. Apparatus as set forth in claim 24 in which said predetermined amount by which said incrementing circuit increments said predetermined count of said sequence number counter, is one.

26. A data bus system, comprising;

a data bus;

a plurality of data utilization units coupled to said data bus;

a sequence number counter for each data utilization unit, the sequence number counters having different counts which differ by the same amount to establish an ordered numerical rank of sequence numbers;

means for each data utilization unit for coupling token number signals to said data bus in a sequence determined by said ordered numerical rank of sequence numbers, said token number signals each representing the sequence number of the transmitting data utilization unit incremented by said same amount; and means for each data utilization unit for decrementing the sequence number counters by said same amount at those data utilization units which have missed receiving a predetermined number of consecutive token number signals.

27. Apparatus as set forth in claim 26, in which:

said same amount is one.

28. Apparatus as set forth in claim 26, in which:

said predetermined number of consecutive token number signals is two.

* * * * *

UNITED STATES PATENT AND TRADEMARK OFFICE
CERTIFICATE OF CORRECTION

PATENT NO. : 4,488,232
DATED : December 11, 1984
INVENTOR(S) : RICHARD E. SWANEY and JOHN HARGROVE It is certified that error appears in the above—identified patent and that said Letters Patent is hereby corrected as shown below:

Column 15, line 55

Delete "unit" and insert therefor --until--

Signed and Sealed this

Twenty-eighth Day of May 1985

[SEAL]

Attest:

DONALD J. QUIGG

*Attesting Officer*     *Acting Commissioner of Patents and Trademarks*